(12) United States Patent
Teramachi et al.

(10) Patent No.: US 7,456,526 B2
(45) Date of Patent: Nov. 25, 2008

(54) LINEAR MOTOR ACTUATOR

(75) Inventors: Akihiro Teramachi, Tokyo (JP);
Toshiyuki Aso, Tokyo (JP); Yoshinobu Tanaka, Tokyo (JP); Hiroshi Kaneshige, Tokyo (JP); Yuanjun Xu, Shanghai (CN)

(73) Assignee: THK Co., Ltd., Tokyo (JP)

( * ) Notice: Subject to any disclaimer, the term of this patent is extended or adjusted under 35 U.S.C. 154(b) by 468 days.

(21) Appl. No.: 10/549,626

(22) PCT Filed: Mar. 22, 2004

(86) PCT No.: PCT/JP2004/003823

§ 371 (c)(1),
(2), (4) Date: Feb. 17, 2006

(87) PCT Pub. No.: WO2004/086597

PCT Pub. Date: Oct. 7, 2004

(65) Prior Publication Data

US 2006/0232141 A1 Oct. 19, 2006

(30) Foreign Application Priority Data

Mar. 25, 2003 (JP) ............................. 2003-082727
Oct. 20, 2003 (JP) ............................. 2003-359179

(51) Int. Cl.
*H02K 41/00* (2006.01)
(52) U.S. Cl. ...................................................... 310/12
(58) Field of Classification Search .................... 310/12
See application file for complete search history.

(56) References Cited

U.S. PATENT DOCUMENTS

| | | | | |
|---|---|---|---|---|
| 5,229,669 A * | 7/1993 | Takei | ........................... | 310/12 |
| 5,416,396 A * | 5/1995 | Takei | ........................... | 318/653 |
| 5,606,256 A * | 2/1997 | Takei | ..................... | 324/207.21 |
| 5,675,195 A * | 10/1997 | Takei | ........................... | 310/12 |
| 5,779,367 A * | 7/1998 | Obara | ........................... | 384/8 |
| 5,945,824 A * | 8/1999 | Obara et al. | ........... | 324/207.22 |
| 6,191,507 B1 * | 2/2001 | Peltier et al. | ................... | 310/12 |
| 6,509,538 B2 * | 1/2003 | Tsukamoto | .............. | 219/69.12 |
| 6,825,656 B2 * | 11/2004 | Hanisch | ................... | 324/207.2 |
| 7,109,610 B2 * | 9/2006 | Tamai | ........................... | 310/12 |
| 2006/0232141 A1 * | 10/2006 | Teramachi et al. | ............ | 310/12 |

FOREIGN PATENT DOCUMENTS

JP     03-265458     11/1991

(Continued)

*Primary Examiner*—James Harvey
(74) *Attorney, Agent, or Firm*—Westerman, Hattori, Daniels & Adrian, LLP.

(57) ABSTRACT

A track rail is formed in a channel-like configuration while having a guide passage for sliders. A table structure that moves within the guide passage includes: a pair of sliders that move forwards and backwards within the guide passage; and a connecting top board connecting those sliders to each other with a predetermined interval therebetween and provided with a mounting surface for a movable member. An armature constituting a linear motor is received between the pair of sliders, and field magnets constituting the linear motor are arranged in the track rail so as to face the guide passage. The armature and the field magnets, which constitute the linear motor, are completely integrated with the table structure and the track rail, which constitute a linear guide, and are entirely contained inside the linear guide.

10 Claims, 9 Drawing Sheets

FOREIGN PATENT DOCUMENTS

| | | |
|---|---|---|
| JP | 3-265458 | 11/1991 |
| JP | 05-227729 | 9/1993 |
| JP | 5-227729 | 9/1993 |
| JP | 10-290560 | 10/1998 |
| JP | 2001-025229 | 1/2001 |
| JP | 2001-211630 | 8/2001 |

* cited by examiner

LINEAR MOTOR ACTUATOR

TECHNICAL FIELD

The present invention relates to a linear motor actuator which supports a movable member such as a table on a stationary portion such as a bed by using a linear guide so that the movable member is free to reciprocate, the linear motor actuator being capable of repeatedly positioning the movable member with respect to the stationary portion by utilizing a propulsion force or brake force generated by a linear motor. More specifically, the present invention relates to an improvement for integrating the linear motor and the linear guide in a compact manner.

BACKGROUND ART

Linear actuators, which impart linear motion to a movable member such as a table and cause the movable member to stop at a predetermined position, are frequently used for various kinds of tables of machine tools, the moving portion of industrial robots, various kinds of conveying devices, and the like. Conventionally, with respect to the linear actuators of this type, known examples of driving means for imparting a propulsion force or brake force to the movable member include one which converts the rotation of a motor into linear motion by using a ball screw and one which converts the rotation of a motor into linear motion by using an endless timing belt wound around a pair of pulleys. Recent years have seen the appearance of various types of actuators employing a linear motor as drive means, that is, linear, motor actuators.

As the most common type of linear motor actuators, there is known one in which the movable member is supported on a stationary portion such as a bed or a column by using a pair of linear guides so that the movable member is free to reciprocate, and in which a stator and a mover that constitute a linear motor are respectively mounted to the stationary portion and the movable member so as to be opposed to each other (JP 10-290560A and the like). Specifically, a track rail of each linear guide is arranged in the stationary portion and the stator of the linear motor is mounted in parallel to the track rail, and a slider of the linear guide and the mover of the linear motor are mounted to the movable member; by incorporating the slider on the movable member side into the track rail, the movable member is supported on the stationary member so as to freely reciprocate, and the stator on the stationary portion side and the mover on the movable member side are opposed to each other.

With linear motor actuators, the parallelism between the track rail of the linear guide and the stator of the linear motor is important in securing the accuracy of the movement of the movable member, and it is also important, for the purpose of attaining a sufficient propulsion force, that the stator and mover of the linear motor be opposed to each other through a predetermined air gap. However, in the case of the linear motor actuators whose linear guide and linear motor are completely separated from each other as described above, it is extremely difficult and troublesome to perform the assembly while taking the above requirements into consideration.

Typical examples of linear motors include so-called synchronous motors composed of a field magnet employing a permanent magnet and of an armature around which a coil is wound. As the synchronous motors, there exist those of a core-attached type having a core formed of a magnetic member and those of a core-less type with no such core attached. Although the core-attached type ones prove effective from the viewpoint of obtaining a large propulsion force, due to the existence of the core, a magnetic attraction force equivalent to several times of the propulsion force is exerted between the armature and the field magnet even when no electric current is passed through the armature. For this reason, the above-mentioned assembly operation becomes even more difficult in the case where such a core-attached type linear motor is adopted.

On the other hand, known examples of linear motor actuators in which the linear guide and the linear motor are integrated together include those disclosed in JP 05-227729 A and JP 2001-25229 A. In the linear motor actuator of the former type disclosed in JP 05-227729 A, a recessed groove is formed in the track rail along the longitudinal direction thereof, with the armature being received within the recessed groove, and the slider is formed in a saddle-like configuration straddling the track rail. In the slider, the field magnet is fixed at a position opposed to the armature on the track rail side; when electric current is passed through the armature, a propulsion force is exerted on the slider incorporating the field magnet due to the Fleming's left-hand rule, so the slider moves along the track rail. That is, this linear motor actuator is a movable magnet type linear motor actuator having the field magnet as a mover.

However, with the movable magnet type linear motor actuator, the armature must be provided over the entire length of the track rail, and in order to set the resolution of the actuator with high accuracy, the armature coil must be finely segmented. Accordingly, when a large stroke length is set for the slider, this not only makes the preparation of the armature coil rather troublesome but also causes an increase in cost.

In contrast, the linear motor actuator of the latter type disclosed in JP 2001-25229 A is a so-called movable coil type one in which the armature moves together with the slider. That is, the field magnet is directly fixed to the track rail of the linear guide, and the armature is mounted in the slider; when electric current is passed through the armature to excite the armature coil, the slider incorporating the armature moves along the track rail.

However, with the above linear motor actuator, although the armature and the field magnet are fixed to the slider and track rail of the linear guide, respectively, they are externally fixed without being incorporated in the track rail and the slider, so the size of the actuator itself disadvantageously increases. Further, there is a risk that the field magnet or the armature may come into contact with peripheral equipment during the transport operation or the mounting operation thereof to the stationary portion such as a bed, resulting in damage.

DISCLOSURE OF THE INVENTION

The present invention has been made in view of the problems as described above, and it is an object of the present invention to provide a linear motor actuator which is capable of imparting a large propulsion force to a movable member such as a table and which achieves a compact construction by integrating a linear guide and a linear motor together, thereby enabling manufacture at low cost as well as ease of handling.

To attain the above object, a linear motor actuator according to the present invention includes: a track rail having a stationary base portion and a pair of side wall portions extending upright from the stationary base portion, the track rail being formed in a channel-like configuration including a guide passage surrounded by the stationary base portion and the side wall portions, the side wall portions each being provided with a ball rolling groove facing the guide passage; a table structure including a large number of balls that roll in the ball rolling groove, and an endless circulation passage in which the balls circulate, the table structure being mounted between the pair of side wall portions of the track rail through the balls to freely move within the guide passage; a field magnet fixed to the track rail and having N poles and S poles alternately arranged along a longitudinal direction of the track rail; and an armature mounted to the table structure such that the armature is opposed to the field magnet, the armature constituting a linear motor together with the field magnet and exerting on the table structure a propulsion force or a brake force acting in the longitudinal direction of the track rail.

The table structure includes: a pair of sliders each including the endless circulation passage for the balls and moving forwards and backwards within the guide passage of the track rail; and a connecting top board connecting the sliders to each other with a predetermined interval between the sliders and provided with a mounting surface for a movable member. Because the pair of sliders are connected to each other with an interval therebetween by the connecting top board, a space is formed between those sliders in the guide passage of the track rail. This space serves as the space for receiving the armature. Further, the armature is located within the guide passage of the track rail while being fixed to the connecting top board at a position between the pair of sliders, and includes an armature core of a comb tooth-like configuration and a coil, the armature core having a plurality of slots and teeth formed at a predetermined pitch along the longitudinal direction of the track rail, the coil being wound around each of the teeth of the armature core so as to fill in each slot. That is, the armature is placed within the guide passage of the track rail while being suspended from the connecting top board. In other words, the connecting top board connecting the pair of sliders to each other serves as a lid for the guide passage, whereby the armature is enclosed within the guide passage. That is, according to the structure adopted by the present invention, the armature that constitutes the linear motor is entirely received within the guide passage of the track rail and no portion of the armature is exposed to the outside. Further, the field magnet that constitutes, together with the armature, the linear motor is disposed at the position opposed to the armature core fixed to the connecting top board, with the stationary base portion of the track rail serving as the yoke of the field magnet. Accordingly, in the linear motor actuator according to the present invention, the armature and the field magnet, which constitute the linear motor, are completely integrated with the table structure and the track rail, which constitute the linear guide, and are entirely contained inside the linear guide, thereby achieving an extremely compact construction. Further, there is no fear of the linear motor being exposed to the outside of the track rail formed in a channel-like configuration, thereby achieving extreme ease of handling during the transport or mounting operation.

Further, the armature is directly connected to the connecting top board of the table structure, and the field magnet is simply disposed on the stationary base portion of the track rail. Accordingly, there is no need to provide any special bracket or the like for mounting those components to the table structure and the track rail, thereby achieving manufacture at extremely low cost.

Further, with the linear motor actuator according to the present invention, the interval between the pair of sliders can be arbitrarily set by changing the length of the connecting top board as appropriate. Accordingly, depending on the intended application, the number of the armatures to be placed in the longitudinal direction of the track rail can be changed as appropriate in order to secure the propulsion force required for the table structure, thereby making it possible to flexibly cope with the excess/deficiency of the propulsion force for the table structure.

In order to secure sufficient propulsion and brake forces to be imparted to the table structure, the armature is equipped with the armature core formed of a magnetic member. The armature core has the plurality of slots and teeth formed alternately at a predetermined pitch along the longitudinal direction of the track rail, that is, in the direction in which the table structure moves. As a conceivable example of the formation pitch of those teeth, assuming that the repeating cycle of the magnetic poles in the field magnet is $\lambda$, the formation pitch may be set to $\lambda n/4$ (n is an integer) On the other hand, since they support the movable member such as a table while moving within the guide passage of the track rail, the pair of sliders constituting the table structure must have a high rigidity, and as such, are usually formed of a metal material. For this reason, when the field magnet is provided so as to face the guide passage of the track rail, the magnetic force of the field magnet is exerted on the sliders, with the result that a resistance acts intermittently with respect to the movement of the sliders as the sliders are moved within the guide passage. This phenomenon is called cogging, which occurs due to the positional relation between the plurality of magnetic poles, which are arranged in the field magnet, and the sliders. When such cogging exerts a large influence, the moving speed or acceleration of the table structure changes, and the accuracy of the stopping position of the table structure is also affected. Therefore, it is necessary to make such cogging as small as possible. In view of this, it is preferable to form in the lower surface of each slider, that is, in the surface thereof opposed to the stationary base portion of the track rail, a plurality of slots and teeth alternately along the movement direction of the slider, thus forming the above surface in a comb-tooth like configuration as a whole. When such slots and teeth are formed in each of the sliders, by adjusting the formation pitch thereof, the magnetic force exerted by the field magnet to attract the sliders in the movement direction thereof can be substantially, if not totally, canceled out, thereby making it possible to reduce the occurrence of the cogging.

At this time, the formation pitch of the slots and teeth in the sliders may be adjusted as appropriate. In this regard, since the formation pitch of the slots and teeth formed in the armature core is also set so as to suppress the cogging, it is preferable, like the formation pitch of the slots and teeth in the armature core, to set the formation pitch of the slots and teeth in the sliders to $\lambda n/4$ (n is an integer) and to arrange the teeth of the sliders adjacent to the teeth of the armature core in the lateral direction.

Even when the formation pitch of the slots and teeth in the armature core is set to $\lambda n/4$ (n is an integer), cogging that results from the positional relation between the armature core and the field magnet cannot be completely eliminated. In addition, as described above, cogging occurs in the sliders themselves due to the positional relation between them and the field magnet. In view of this, it is preferable that fixing means for fixing the sliders to the connecting top board be capable of freely changing a fixing position of the sliders to the connecting top board along the direction in which the table structure moves. With this construction, by performing fine adjustment on the fixing position of the armature with respect to the connecting top board along the movement direction of the table structure, it is possible to find the fixing position where the cogging that occurs due to the sliders and the cogging that occurs due to the armature core are canceled by each other. By fixing the armature to the connecting top board at such a position, cogging that occurs upon incorporating the linear motor into the linear guide can be almost entirely eliminated.

As described above, with the linear motor actuator according to the present invention, the armature and the field magnet, which constitute the linear motor, are completely integrated with the sliders and the track rail, which constitute the linear guide, and are entirely contained inside the linear guide, thereby achieving an extremely compact construction. Further, there is no fear of the linear motor being exposed to the outside of the track rail formed in a channel-like configuration, thereby achieving extreme ease of handling during the transportor mounting operation. Further, the armature is directly connected to the connecting top board of the table structure, and the field magnet is simply disposed on the stationary base portion of the track rail. Accordingly, there is no need to provide any special bracket or the like for mounting those components to the table structure and the track rail, thereby achieving manufacture at extremely low cost.

DESCRIPTION OF REFERENCE SYMBOLS

1 . . . track rail, 2 . . . movable member, 3 . . . table structure, 3a, 3b . . . slider, 3c . . . connecting top board, 4 . . . field magnet, 5 . . . armature, 10 . . . stationary base portion, 11 . . . side wall portion, 30 . . . bearing portion, 31 . . . top board portion, 50 . . . armature core, 51 . . . coil, 52 . . . teeth

BEST MODE FOR CARRYING OUT THE INVENTION

Hereinbelow, a linear motor actuator according to the present invention will be described in detail with reference to the accompanying drawings.

Figure 1:
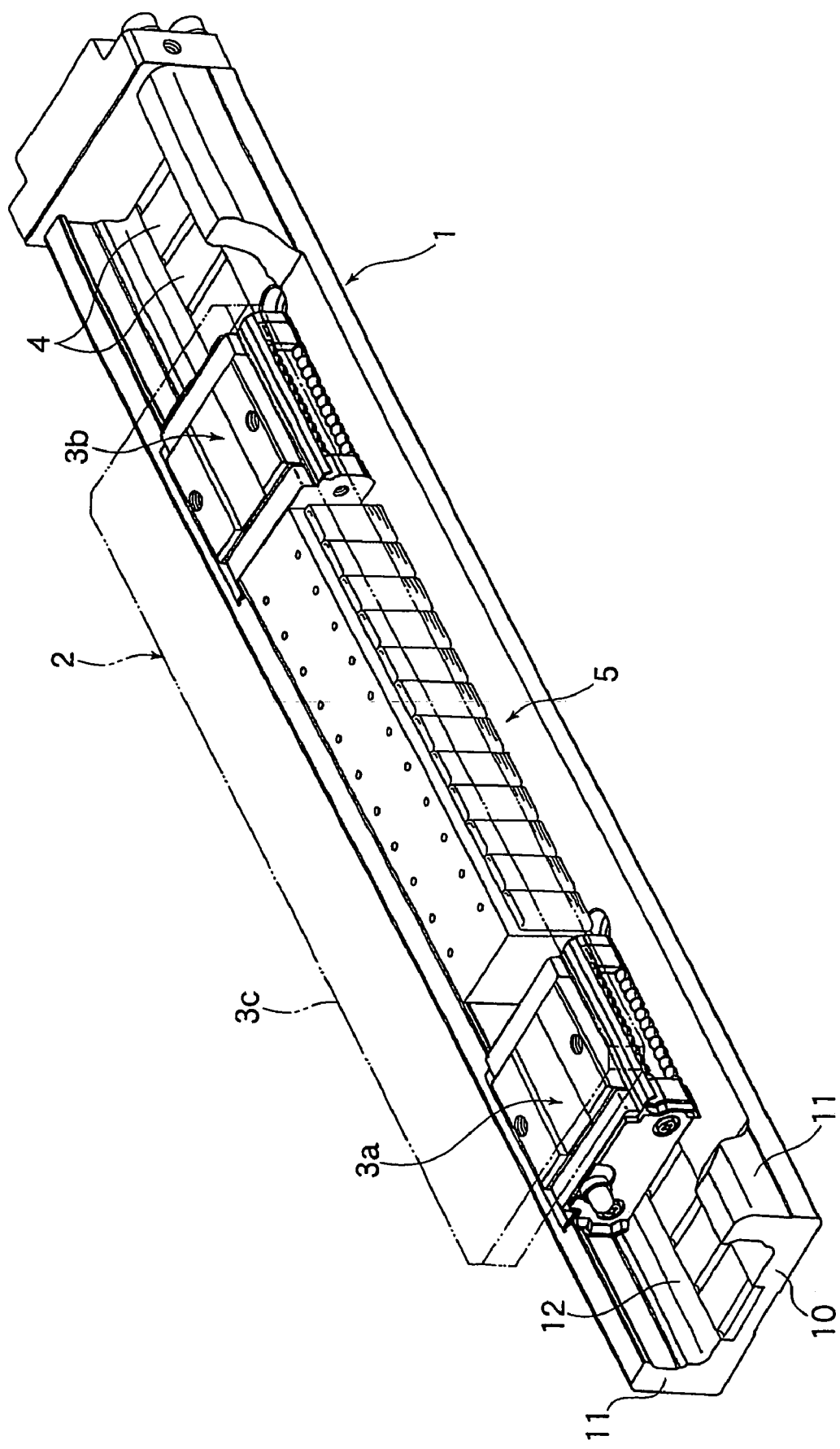
FIG. 1 is a perspective view showing a linear motor actuator according to a first embodiment of the present invention.

FIG. 1 shows a linear motor actuator according to a first embodiment of the present invention. The linear motor actuator is composed of: a track rail 1 formed in a channel-like configuration; a table structure 3 incorporating a movable member as the target control object and movable along the track rail 1; field magnets 4 arranged on the track rail 1; and an armature 5 mounted in the table structure 3 and constituting a linear motor together with the field magnets 4. By exciting the armature 5 mounted in the table structure 3, the table structure 3 can be propelled along the track rail 1 to be stopped at a predetermined position.

The track rail 1 has a stationary base portion 10 mounted to a stationary portion such as a bed by means of a bolt (not shown), and a pair of side wall portions 11, 11 extending upright from the stationary base portion 10. The space surrounded by the stationary base portion 10 and the side wall portions 11 serves as a guide passage 12 in the form of a recessed groove. The table structure 3 reciprocates along the guide passage 12. Further, two, upper and lower, ball rolling grooves 13 are formed in the inner side surface of each side wall portion 11 facing the guide passage 12. The ball rolling grooves 13 are formed along the longitudinal direction (direction perpendicular to the plane of the drawing) of the track rail 1.

On the other hand, the table structure 3 is composed of a pair of sliders 3a, 3b arranged within the guide passage of the track rail and capable of freely reciprocating within the guide passage, and a connecting top board 3c connecting the sliders 3a, 3b to each other with a predetermined distance therebetween. The connecting top board 3c is formed in a substantially rectangular configuration whose long side is aligned with the longitudinal direction of the track rail 1. The sliders 3a, 3b located within the guide passage 12 of the track rail 1 are respectively fixed to the opposite longitudinal end portions of the connecting top board 3c. On the other hand, the connecting top board 3c itself is mounted onto the sliders 3a, 3b and located outside the guide passage 12 of the track rail 1. Further, the armature 5 is provided between the pair of sliders 3a, 3b fixed onto the connecting top board 3c. The armature 5 is located within the guide passage 12 of the track rail 1 while being suspended from the connecting top board 3c.

Figure 2:
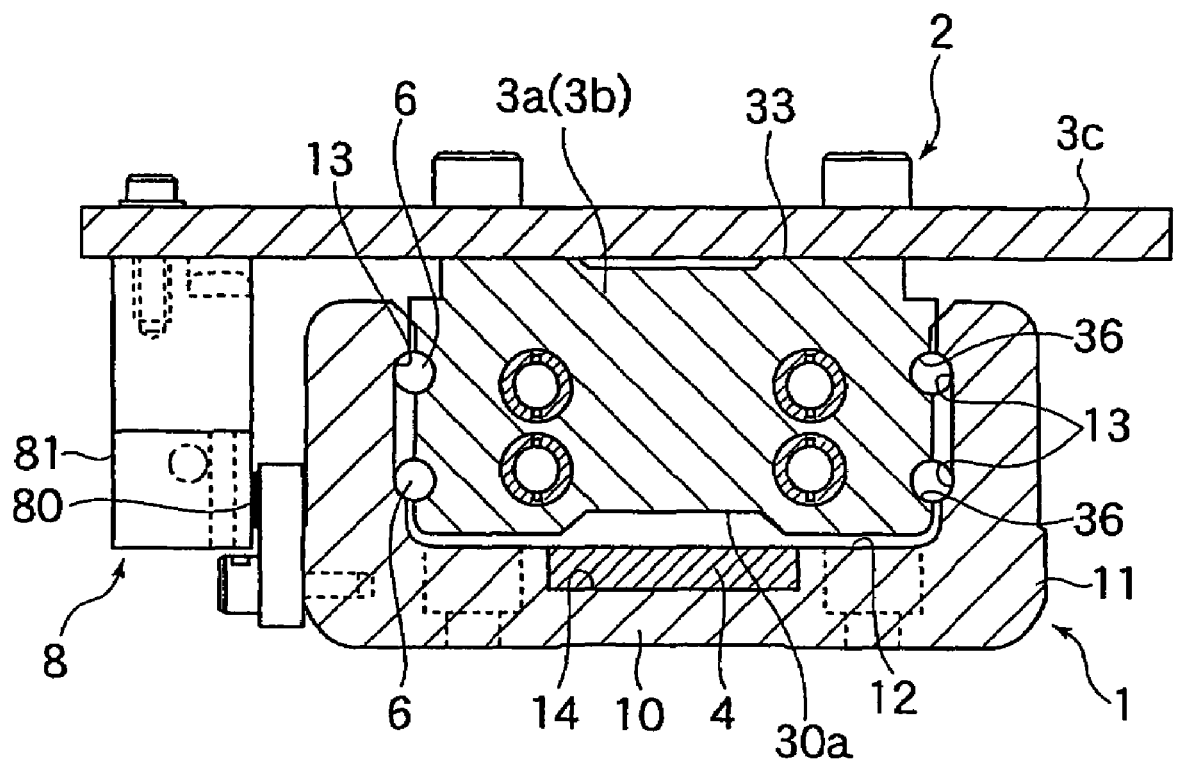
FIG. 2 is a sectional view taken along the line II-II of FIG. 1.

FIG. 2 is a sectional view showing the track rail 1 and the sliders 3a, 3b. Each of the sliders 3a, 3b, which are formed in a substantially rectangular configuration and arranged within the guide passage 12 of the track rail 1, at least partially protrudes outwards from the guide passage 12 of the track rail 1, and has a mounting surface 33 for the connecting top board 3c which is formed in the top surface located above the upper end of the side wall portion 11 of the track rail 1. The sliders 3a, 3b are each equipped with two right and left, that is, a total of four endless circulation passages in which balls 6 circulate. Each endless circulation passage corresponds to each of the ball rolling grooves 13 formed in the side wall portion 11 of the track rail 1.

Figure 3:
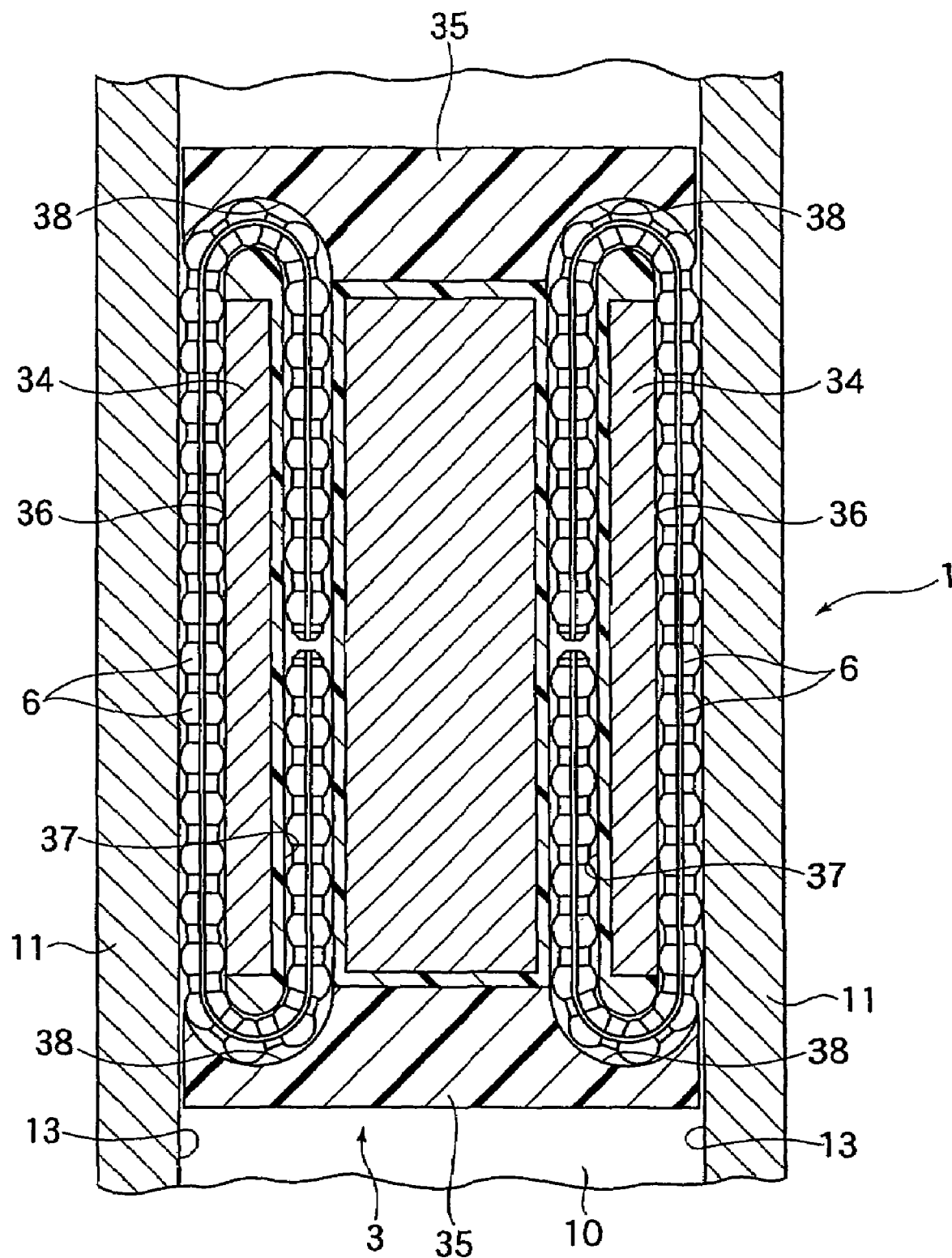
FIG. 3 is a plan sectional view showing endless circulation passages in the linear motor actuator according to the first embodiment.

FIG. 3 is a plan view showing the ball endless circulation passages in the sliders. The sliders 3a, 3b are each composed of a bearing race 34 formed of a metal block such as bearing steel, and a pair of end caps 35 made of synthetic resin which are respectively fixed to the front and rear end surfaces of the bearing race 34 with respect to the movement direction of the sliders 3. Each endless circulation passage is composed of: a load rolling groove 36 formed in the outer surface of the bearing race 34; a ball return hole 37 formed in the bearing race 34 so as to extend parallel to the load rolling groove 36; and a U-shaped direction switching passage 38 formed in each of the end caps 35. A large number of the balls 6 are adapted to roll under load between the ball rolling groove 13 of the track rail 1 and the load rolling groove 36 of the bearing race 34. Further, after having finished rolling in the load rolling groove 36, the balls 6 enter the direction switching passage 38 in one of the end caps 35, where the balls 6 are released from the load, and then roll in the ball return hole 37 under a no-load condition. Further, the balls 6 then roll in the direction switching passage 38 in the other of the end caps 35. In this way, the balls 6 are circulated to the load rolling groove 36 of the bearing race 34 again. It should be noted that when the balls 6 roll under the no-load condition in the ball return hole 37, the balls 6 and the inner peripheral surface of the ball return hole 37 come into contact with each other, thus generating noise. To avoid this, the inner peripheral surface of the ball return hole 37 is coated with synthetic resin.

Figure 4:
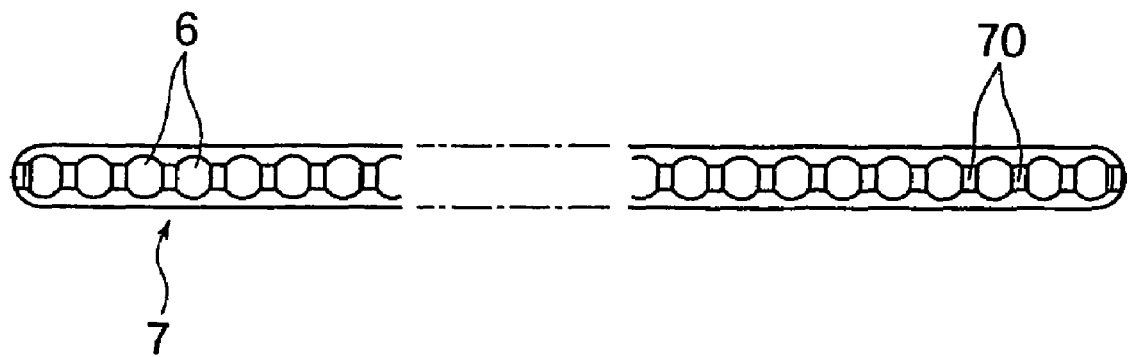
FIG. 4 is a plan view showing a spacer belt used in the linear motor actuator according to the first embodiment.
Figure 5:
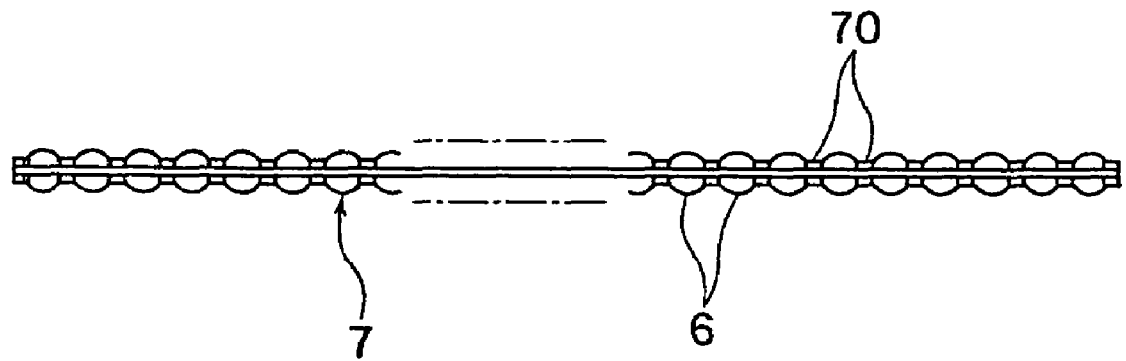
FIG. 5 is a side view showing the spacer belt used in the linear motor actuator according to the first embodiment.

As shown in FIGS. 4 and 5, the balls 6 are arranged on a flexible spacer belt 7 formed of synthetic resin at a predetermined interval, and are incorporated into the respective endless circulation passages of the sliders 3a, 3b together with the spacer belt 7. The space belt 7 is provided with spacer portions 70 formed so as to separate adjacent balls from each other, thereby preventing the balls 6 from contacting with each other while circulating within the endless circulation passage. Further, a receiving hole for receiving each ball 6 is formed between every pair of two longitudinally adjacent spacer portions 70. Each ball 6 is received in the receiving hole. Accordingly, noise is not generated due to contact between the balls in the endless circulation passage even when the sliders 3a, 3b move at high speed within the guide passage 12 of the track rail 1. Therefore, it is possible to suppress the occurrence of noise accompanying the high-speed movement of the sliders 3a, 3b and to prevent the balls 6 from moving in a zigzag motion within the endless circulation passage, thereby ensuring smooth movement of the sliders 3a, 3b with respect to the track rail 1 and, by extension, smooth movement of the table structure 3.

The sliders 3a, 3b constructed as described above are arranged within the guide passage 12 of the track rail 1 so as to be sandwiched between the pair of side walls 11, 11 of the track rail 1 through the balls 6. As each ball 6 rolls in the ball rolling groove 13 of the track rail 1, the sliders 3a, 3b can freely reciprocate along the longitudinal direction of the track rail 1. At this time, the track rail 1 exhibits an extremely high rigidity because it is formed in a channel-like configuration so as to surround the guide passage 12. Further, since the table structure 3 is guided by the pair of sliders 3a, 3b, the table structure 3 also possesses a high rigidity with respect to the track rail 1, whereby the table structure 3 can be reciprocated with high accuracy along the track rail 1.

Next, description will be made on the field magnets and the armature which constitute the linear motor.

As shown in FIG. 1, the field magnets 4 are arranged on the stationary base portion 10 of the track rail 1 so as to face the guide passage 12 in which the sliders 3a, 3b reciprocate. In other words, the stationary base portion 10 functions as the yoke of the field magnets 4. The field magnets 4 each consist of a permanent magnet, with their N-poles and S-poles being alternately arranged at a predetermined pitch along the longitudinal direction of the track rail 1. The field magnets 4 must be arranged in parallel to the direction in which the sliders 3a, 3b move in the guide passage 12 of the track rail 1. To this end, recessed grooves 14 are formed in the stationary base portion 10 of the track rail 1 so as to extend parallel to the ball rolling groove 13, so the field magnets 4 are fixed onto the track rail 1 while being fitted in the recessed groove 14.

Figure 6:
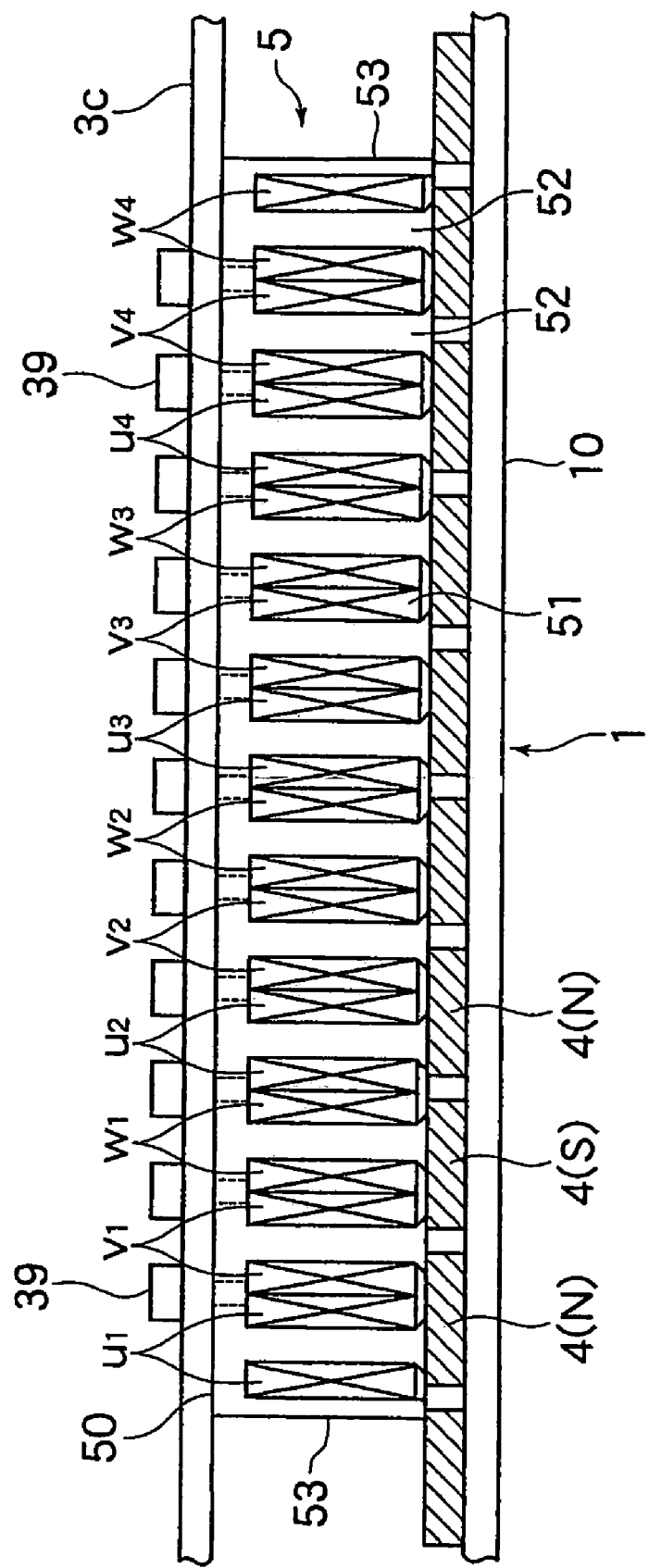
FIG. 6 is a longitudinal sectional view of an armature and field magnets according to the first embodiment taken along the longitudinal direction of a track rail.

On the other hand, FIG. 6 is a longitudinal sectional view showing the positional relation between the armature 5, which is mounted to the table structure, and the field magnets 4 with respect to the longitudinal direction of the track rail 1. The armature 5 is composed of an armature core 50 fixed to the connecting top board 3c with bolts 39, and coils 51 wound around the armature 50. The armature core 50 has a plurality of slots formed at a predetermined pitch along the longitudinal direction of the track rail 1 and thus has a generally comb-tooth like configuration. Twelve teeth 52 each having slots formed in front and in rear thereof are formed in the armature core 50, with the coils 51 being wound around the respective teeth 52 of the armature core 50 so as to fill the respective slots. The coils 51 are wound in three phases of (u1, u2, u3, u4), (v1, v2, v3, v4), and (w1, w2, w3, w4) with respect to the twelve teeth 52. Upon exciting the coils 51 of the three phases, an attractive magnetic force and a repulsive magnetic force are generated between the armature 5 and the field magnets 4, thereby making it possible to exert a propulsion force or brake force along the longitudinal direction of the track rail 1 with respect to the table structure 3 incorporating the armature 5.

The current to be applied to the coils 51 wound in the three phases is determined based on a detection signal from a position detecting device 8 mounted on the outer side of the track rail 1 (see FIG. 2). A linear scale 80, which has ladder patterns repeatedly drawn at a predetermined pitch, is fixed onto the outer side surface of the side wall portion 11 of the track rail 1. On the other hand, an encoder 81 for optically reading the ladder patterns of the linear scale 80 is fixed to the connecting top board 3c of the table structure 3. A controller that determines the current to be applied to the coils 51 of respective phases grasps the current position and current speed of the slider 3 based on an output signal from the encoder 81, and generates a motor current in accordance with the difference between the target position and the current position or the difference between the set speed and the current speed, thus energizing the coils 51 of respective phases.

Figure 7:
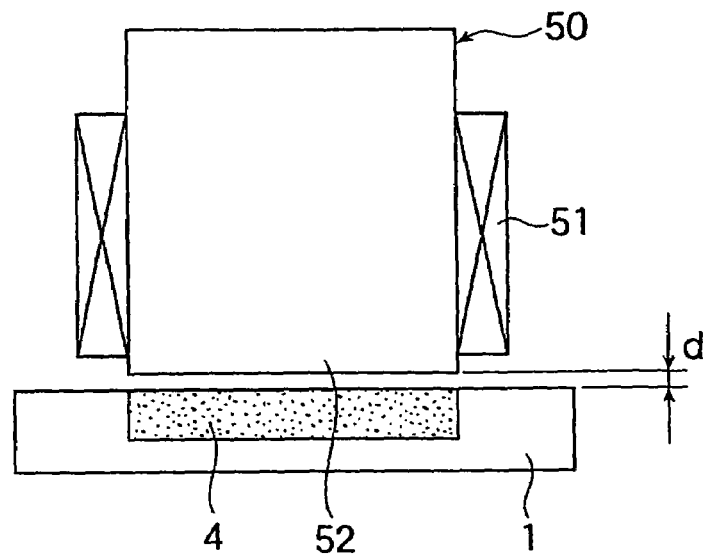
FIG. 7 is an enlarged view showing the positional relation between an armature core and the field magnets.

To generate a large propulsion force by the linear motor, it is important to cause all the magnetic fluxes generated from the field magnet 4 to be exerted on the armature 5. In other words, it is important to reduce so-called leakage magnetic fluxes which dissipate to the surroundings without being exerted on the armature 5. In view of this, as shown in FIG. 7, with the linear motor of this embodiment, a width "a" of the field magnets 4 in the direction orthogonal to the longitudinal direction of the track rail 1 is set to be the same as the width of the armature 50 in the same direction. Further, a distance "d" between the distal end of the teeth 52 of the armature 50 and the field magnets 4 is set to approximately 0.9 mm. Since it is necessary to avoid the contact between the armature 5 and the field magnets 4, the distance "d" is determined based on the amount of maximum displacement which the sliders 3a, 3b undergo when a downward radial load acts on the table structure 3. As a result, the magnetic fluxes of the field magnets 4 are exerted on the armature 50 without leaking to the surroundings.

Further, the armature 5 is fixed to the connecting top board 3c of the table structure 3; when the heat energy generated by the armature 5 flows to the connecting top board 3c, the connecting top board 3c undergoes deformation due to thermal expansion, so the distance "d" between the armature 5 fixed to the connecting top board 3c and the field magnets 4 on the track rail 1 side changes. To avoid this problem resulting from the thermal expansion of the connecting top board 3c, the armature 5 is fixed to the connecting top board 3c through a heat insulating material. Accordingly, there is relatively little inflow of the heat energy generated by the armature 5 to the connecting top board 3c even when the table structure 3 is reciprocated within the guide passage of the track rail 1 continuously for a long period of time.

Although a large propulsion force is easily obtained with the linear motor equipped with the armature core 50 as described above, a magnetic force is exerted between the armature core 50 and the field magnet 4 even when the coil 51 is not energized. Accordingly, as the armature 5 is moved along the longitudinal direction of the track rail 1 together with the table structure 3, a resistance tends to act intermittently with respect to the movement of the table structure 3 according to the positional relation between the teeth 52 of the armature core 50 and the field magnets 4. In other words, cogging occurs. When such cogging acts with respect to the movement of the table structure 3, periodic speed variations occur as the table structure 3 is propelled upon exciting the coil 51. Such variations are fed back to the controller through the position detecting device 8, resulting in a deterioration in controllability with respect to the movement of the table structure 3.

In view of this, a pair of dummy teeth 53, 53 having no coil wound thereon are respectively provided at the forward and rear longitudinal ends of the armature core 50 of this embodiment. The provision of such dummy teeth 53 eliminates or reduces the cogging occurring when the armature core 50 is moved in the arrangement direction of the field magnets 4, thereby achieving satisfactory controllability for the table structure 3. At this time, the size of the slots between the teeth 52 around which the coils 51 are wound and the dummy teeth 53 or the thickness of the dummy teeth 53 themselves varies according to the magnitude of the magnetic force exerted on the armature core 50 by the field magnets 4.

On the other hand, since the sliders 3a, 3b of the table structure 3 are disposed close to the stationary base portion 10 of the track rail 1 in which the field magnets 4 are arranged, and the sliders 3a, 3b each include the bearing race 34 formed of bearing steel, the cogging described above occurs not only between the field magnets 4 and the armature core 50 but also between the field magnets 4 and the sliders 3a, 3b.

In view of this, to reduce the magnetic force of the field magnets 4 acting on the bearing race 34, with the sliders 3a, 3b of this embodiment, a recess 30a is formed in the lower surface of the bearing race 34, that is, in the surface opposed to the field magnets 4 on the stationary base portion 10, thus providing a space between the field magnets 4 and the bearing race 34 of each of the sliders 3a, 3b. The opening width of the recess 30a is larger than the width of the field magnets 4, thereby locating the bearing race 34 as far away as possible from the field magnets 4.

Figure 8:
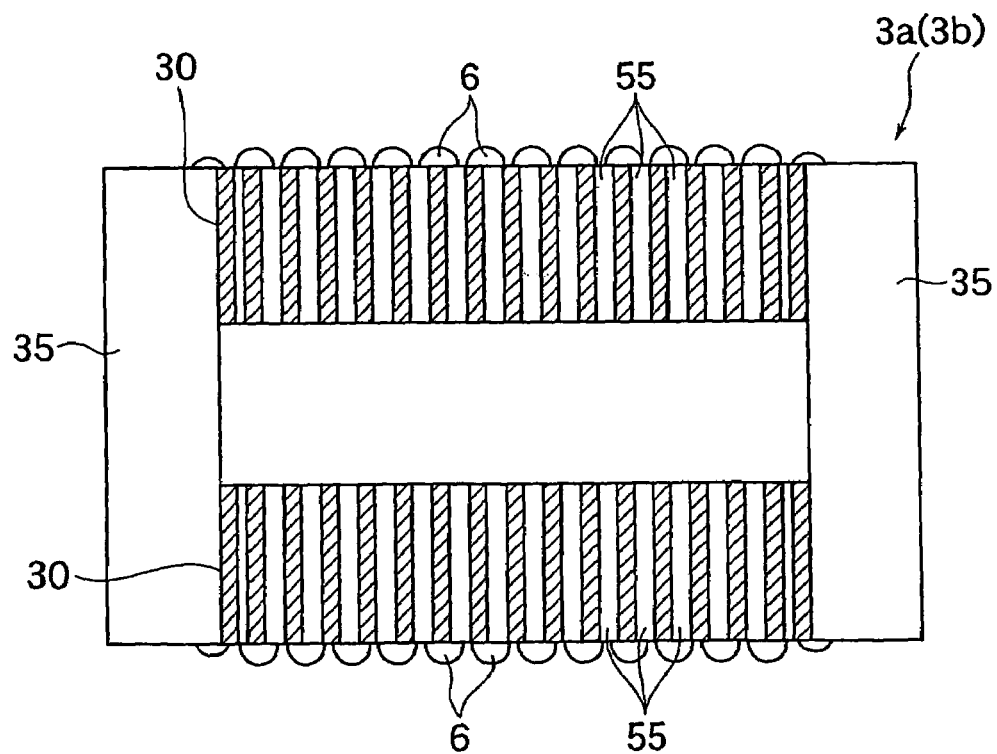
FIG. 8 is a bottom view showing a slider according to the first embodiment.

Further, for the same reasons as described above with respect to the anti-cogging measures for the armature core 50, as shown in FIG. 8, slots 54 and teeth 55 identical to the slots and teeth 52 of the armature core 50 are formed in each of the sliders 3a, 3b of the table structure 3 so as to be opposed to the stationary base portion 10 of the track rail 1. The slots 54 and the teeth 55 are arranged on both sides of the recess mentioned above. Since FIG. 8 is a bottom view of the sliders 3a, 3b and it is impossible to distinguish which of the projections and depressions belong to the regions of the teeth 55 and the regions of the slots 54, hatching is used to indicate the regions of the slots 54. Since the teeth 52 of the armature core 50 are arranged at such an interval as to eliminate or reduce the cogging, by forming the teeth 55 in the sliders 3a, 3b at exactly the same pitch as that of the teeth 52, 53 of the armature core 50, it is possible to eliminate or reduce the cogging that occurs due to the magnetic force of the field magnets 4 acting on the sliders 3a, 3b.

Further, from the viewpoint of eliminating or reducing the cogging for the table structure 3 as a whole by causing the cogging due to the armature core 50 and the cogging due to a bearing portion 30 of each of the sliders 3a, 3b to cancel each other, it is advisable to make the mounting position of the armature core 50 to the connecting top board 3c slightly adjustable with respect to the movement direction of the table structure 3. For example, in fixing the armature core 50 to the connecting top board 3c of the table structure 3 by using the bolts 39, insertion holes for the bolts 39 which are to be formed in the connecting top board 3c are formed as elongated holes extending in the movement direction of the table structure 3, and the fastening of the bolts 39 to the armature core 50 is loosened, thereby making the fixing position of the armature core 50 freely displaceable in the movement direction of the table structure 3. Alternatively, in fixing the sliders 3a, 3b to the connecting top board 3c of the table structure 3 by using bolts, insertion holes for the bolts which are to be formed in the connecting top board 3c are formed as elongated holes extending in the movement direction of the table structure 3, and the fastening of the bolts to the sliders 3a, 3b is loosened, thereby making the fixing position of the sliders 3a, 3b with respect to the connecting top board 3c freely displaceable in the movement direction of the table structure 3. As a result, cogging occurs not only in the armature core 50 but also in the sliders 3a, 3b of the table structure 3, thereby making it possible to eliminate the cogging of the table structure 3 as a whole including the armature 50 and the sliders 3a, 3b.

Figure 9:
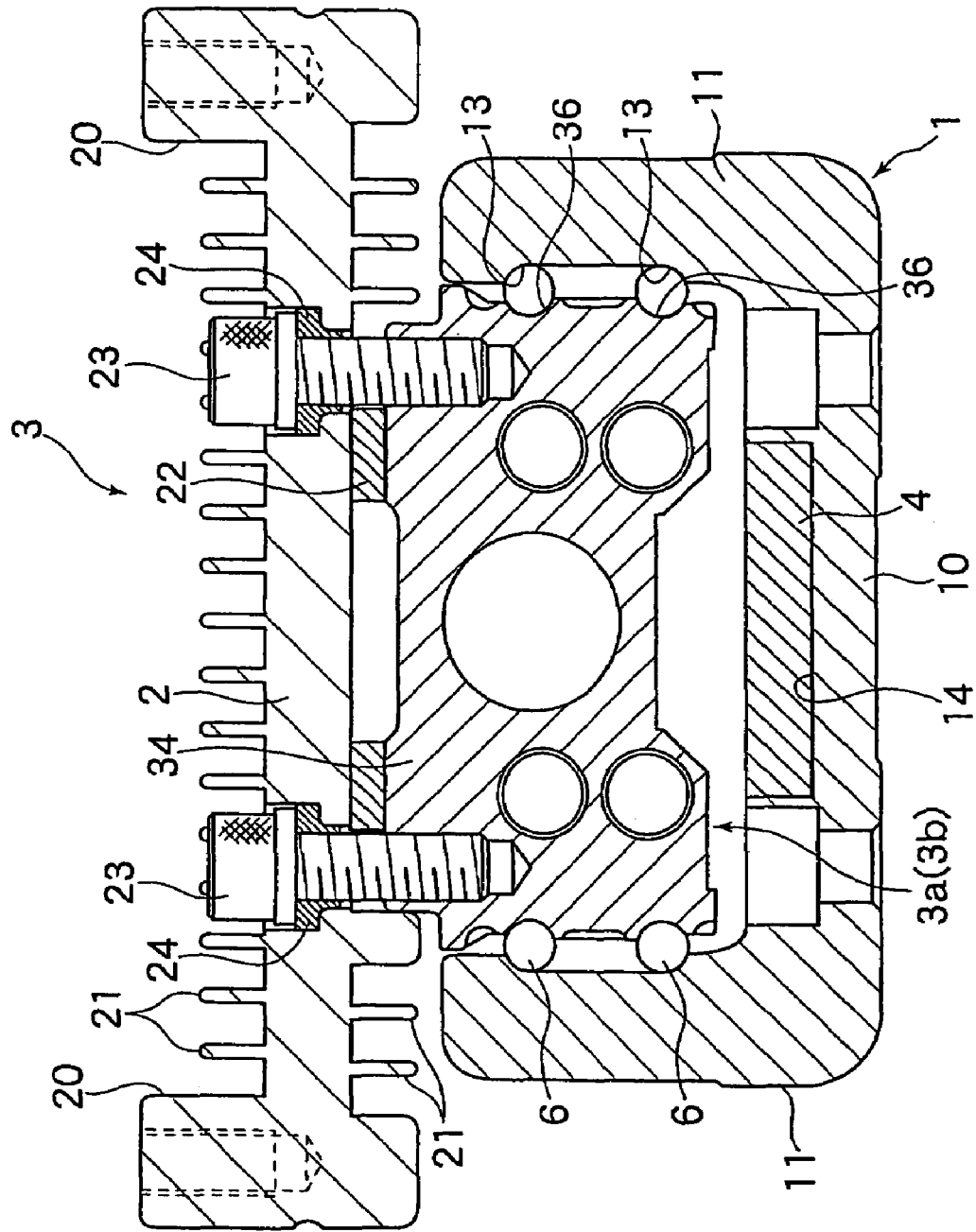
FIG. 9 is a sectional view of the slider in the track rail taken along a direction orthogonal to the direction in which the slider moves, for illustrating a linear motor actuator according to a second embodiment of the present invention.

FIG. 9, which illustrates a linear motor actuator according to a second embodiment of the present invention, is a sectional view of the slider 3a(3b) taken along the direction orthogonal to the longitudinal direction of the track rail 1. According to the second embodiment, although the track rail 1, the sliders 3a, 3b, the field magnets 4, and the armature 5 are of completely the same construction as those of the first embodiment, the structure of a connecting top board 2 differs from that of the connecting top board 3c according to the first embodiment. Specifically, the connecting top board 2 of the second embodiment has a pair of vertical webs 20, 20 provided at its opposite lateral end portions, with the mounting surface for the movable member being formed in each vertical web 20. Formed between the pair of vertical webs 20, 20 is a recess in which a plurality of radiating fins 21 are provided upright at equal intervals. Further, to increase the amount of heat release from the connecting top board 2, the radiating fins 21 are also provided on the back side of the connecting top board 2.

The connecting top board 2 is prepared by using an aluminum alloy exhibiting superior thermal conductivity. By directly fixing the armature 5 to the connecting top board 2 as described above without the intermediation of a heat insulating material, the heat energy generated by the armature 5 flows to the connecting top board 2 and radiated to the surrounding atmosphere by the radiating fins 21. The radiating fins 21 are provided upright along the direction in which the table structure 3 moves within the track rail 1; as the table structure 3 makes a reciprocating motion along the track rail 1, the surrounding atmosphere flows between the adjacent radiating fins 21, which promotes the heat radiation from the connecting top board 2 to the atmosphere. Accordingly, the heat energy generated in the armature 5 does not accumulate there but continuously flows into the connecting top board 2, thereby making it possible to restrain a temperature rise of the armature core 50. As a result, an increase in power supply resistance in the armature 5 can be restrained even when the table structure 3 is continuously reciprocated within the guide passage 12 of the track rail 1 for a long period of time, thereby making it possible to prevent a decrease in the propulsion force of the linear motor.

On the other hand, when heat energy flows into the sliders 3a, 3b from the connecting top board 2, the sliding resistance of the sliders 3a, 3b with respect to the track rail 1 increases due to the thermal expansion of the bearing race 34 or the ball 6, which may inhibit the light motion of the table structure 3. For this reason, as shown in FIG. 9, a heat insulating material 22 is sandwiched between the connecting top board 2 and each of the sliders 3a, 3b, and a heat insulating material 24 is also interposed between each of fixing bolts 23 and the connecting top board 2, thereby preventing the heat energy from flowing from the connecting top board 2 into the sliders 3a, 3b.

It should be noted that in FIG. 9, the same structural components as those of the first embodiment are denoted by the same reference numerals and a detailed description thereof will be omitted.

Figure 10:
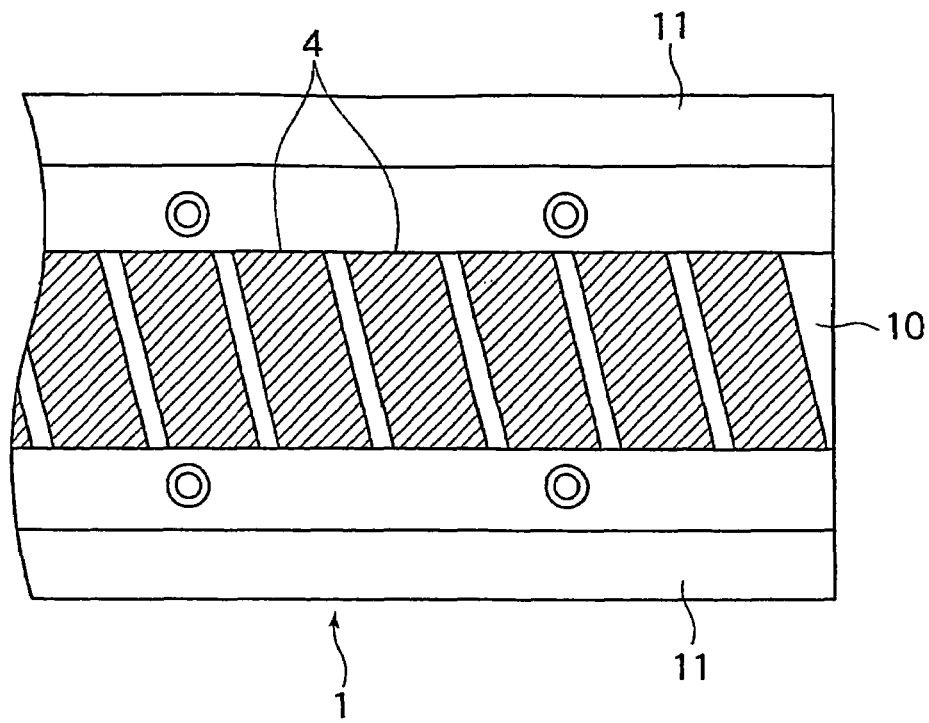
FIG. 10 is a plan view showing another example of how the field magnets are arranged on the track rail.
Figure 11:
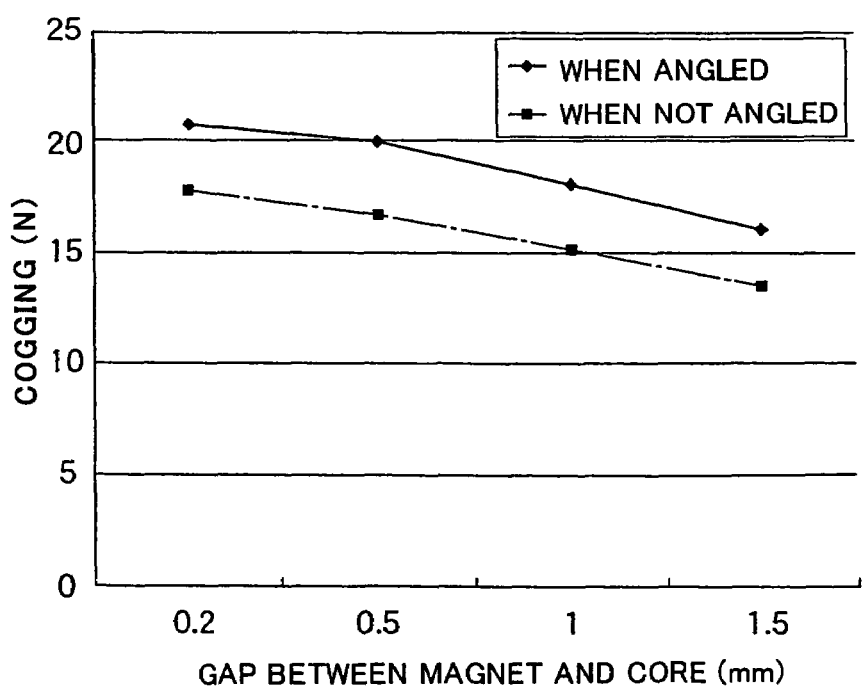
FIG. 11 is a graph showing how the cogging force generated varies due to a difference in the manner in which the field magnets are arranged.

FIG. 10 shows another example of how the field magnets 4 are arranged on the stationary base portion 10 in the track rail 1. In the example shown in FIG. 1, the N and S poles of the field magnets 4 are simply alternated along the longitudinal direction of the track rail 1, with the boundary between the N and S poles being parallel to the lateral direction (the right-left direction as seen in the plane of FIGS. 2 and 9) of the track rail 1. In the example shown in FIG. 10, however, the N and S poles of the field magnets 4 are each formed as a parallelogram, with the boundary between the N and S poles being inclined with respect to the lateral direction of the track rail 1. That is, when the teeth 52 of the armature core 50 advance in the longitudinal direction of the track rail 1, the magnetic pole of the field magnets 4 opposed to the teeth 52 does not suddenly change from the N to S poles or from the S to N poles but changes gradually. FIG. 11 shows the results of measurement on the magnitude of a cogging force acting on the table structure 3 when the table structure 3 is moved, with respect to both the case where the boundary between the field magnets is parallel to the lateral direction of the track rail 1 and the case where the boundary is inclined with respect to the lateral direction of the track rail 1. The graph indicated by the solid line represents the results in the former case (the example of FIG. 1), and the graph indicated by the alternate long and short dash line represents the results in the latter case (the example of FIG. 10). As is apparent from those graphs, of the two cases, the cogging force is consistently smaller in the case where the boundary between the magnetic poles is inclined with respect to the lateral direction of the track rail 1, irrespective of the gap between the field magnets 4 and the teeth 52 of the armature core 50. Therefore, in the case where motion involving small speed variations and high-accuracy positioning are desired, the arrangement shown in FIG. 10 is the preferred arrangement of the field magnets 4 on the stationary base portion 10 of the track rail 1.

Figure 12:
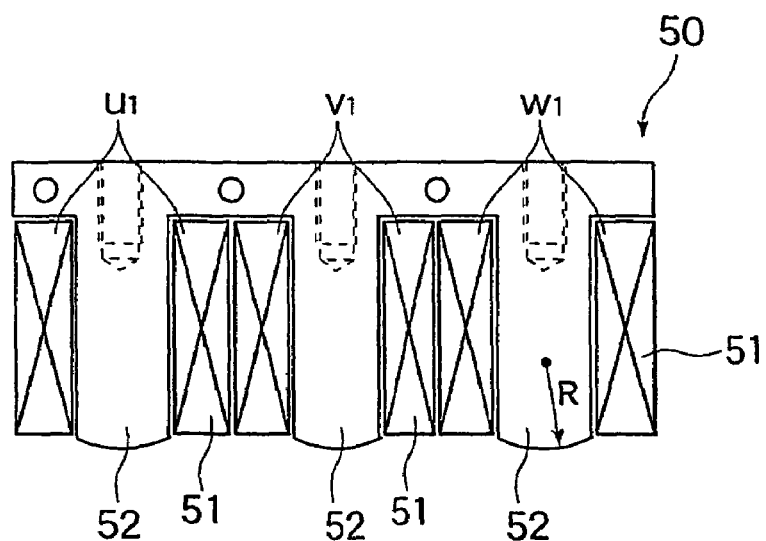
FIG. 12 is an enlarged view showing another example of a distal end surface configuration of teeth of the armature core.
Figure 13:
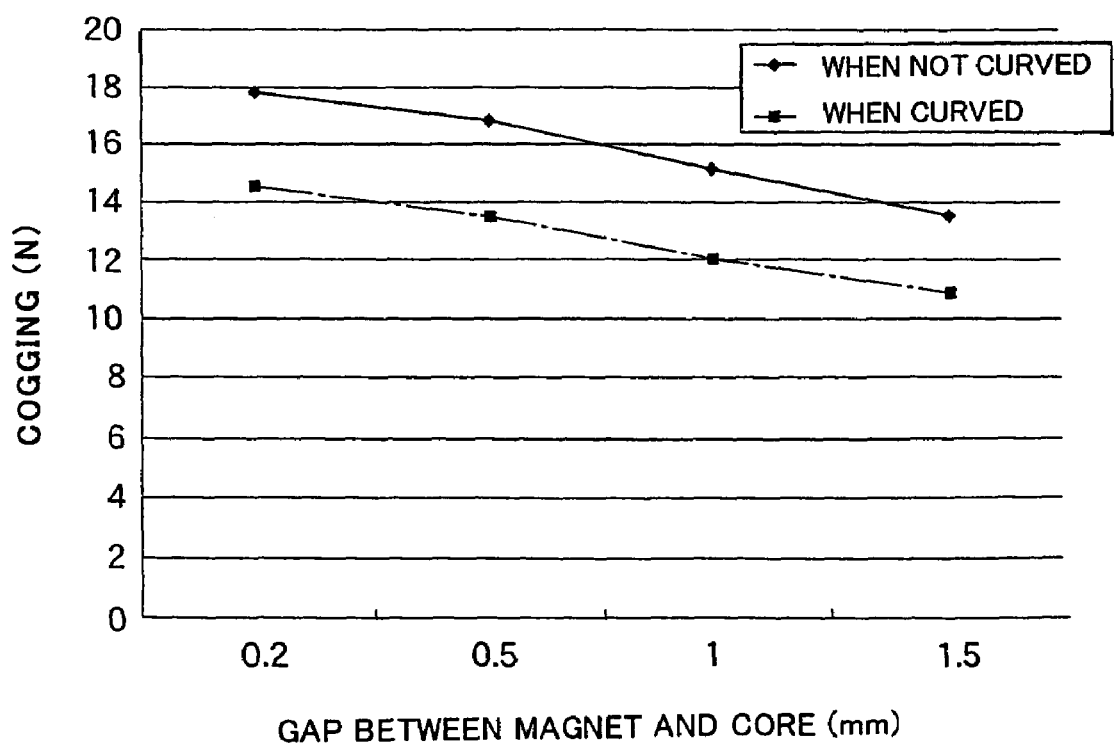
FIG. 13 is a graph showing how the cogging force generated varies due to a difference in the distal end surface configuration of the teeth of the armature core.

On the other hand, FIG. 12 shows another example of the distal end configuration of the teeth 52 of the armature core 50. While in the example shown in FIG. 6, the teeth 52 of the armature core 50, which are opposed to the field magnets 4 through a small gap, have a flat distal end surface, in the example shown in FIG. 12, the distal end surface of the teeth 52 of the armature core 50 is formed as a curved surface having a predetermined radius of curvature R. FIG. 13 shows the results of measurement on the magnitude of a cogging force acting on the table structure 3 when the table structure 3 is moved, with respect to both the case where the distal end surface of the teeth 52 of the armature core 50 is flat and the case where it is curved. The graph indicated by the solid line represents the results in the former case (the example of FIG. 6), and the graph indicated by the alternate long and short dash line represents the results in the latter case (the example of FIG. 12). As is apparent from those graphs, of the two cases, the cogging force is consistently smaller in the case where the distal end surface of the teeth 52 of the armature core 50 are curved with a predetermined radius of curvature, irrespective of the gap between the field magnets 4 and the armature core 50. Therefore, in the case where motion involving small speed variations and high accuracy positioning are desired, the distal end surface of the teeth 52 of the armature core 50 is preferably curved as shown in FIG. 12.

The invention claimed is:

1. A linear motor actuator comprising:

a track rail having a stationary base portion and a pair of side wall portions extending upright from the stationary base portion, the track rail being formed in a channel-like configuration including a guide passage surrounded by the stationary base portion and the side wall portions, the side wall portions each being provided with a ball rolling groove facing the guide passage;

a table structure including a large number of balls that roll in the ball rolling groove, and an endless circulation passage in which the balls circulate, the table structure being mounted between the pair of side wall portions of the track rail through the balls to freely reciprocate within the guide passage;

a field magnet fixed to the track rail and having N poles and S poles alternately arranged along a longitudinal direction of the track rail; and an armature mounted to the table structure such that the armature is opposed to the field magnet, the armature constituting a linear motor together with the field magnet and exerting on the table structure a propulsion force or a brake force acting in the longitudinal direction of the track rail, the linear motor actuator being characterized in that:

the table structure includes: a pair of sliders each including the endless circulation passage for the balls and moving forwards and backwards within the guide passage of the track rail; and a connecting top board connecting the sliders to each other with a predetermined interval between the sliders and provided with a mounting surface for a movable member;

the armature is located within the guide passage of the track rail while being fixed to the connecting top board at a position between the pair of sliders, the armature including an armature core of a comb tooth-like configuration and a coil, the armature core having a plurality of slots and teeth formed at a predetermined pitch along the longitudinal direction of the track rail, the coil being wound around each of the teeth of the armature core so as to fill in each of the slots; and the field magnet is disposed at a position opposed to the armature core fixed to the connecting top board, with the stationary base portion of the track rail serving as a yoke of the field magnet.

2. A linear motor actuator according to claim 1, characterized in that the armature is directly connected to the connecting top board, and that the sliders are fixed to the connecting top board through a heat insulating material.

3. A linear motor actuator according to claim 1 or 2, characterized in that the connecting top board has a radiating fin provided upright along a direction in which the table structure moves.

4. A linear motor actuator according to claim 1, characterized in that a width of the field magnet in a direction perpendicular to the longitudinal direction of the track rail is the same as a width of the armature core in the same direction.

5. A linear motor actuator according to claim 1, characterized in that the stationary base portion of the track rail has a recessed groove extending parallel to the ball rolling groove, the field magnet being fixed in the recessed groove.

6. A linear motor actuator according to claim 1, characterized in that the sliders each have a recess formed in a surface opposed to the stationary base portion of the track rail, the recess having an opening width larger than a width of the field magnet.

7. A linear motor actuator according to claim 1, characterized in that the sliders each have, in a surface opposed to the stationary base portion of the track rail, slots and teeth formed at a pitch equal to n (n is an integer) times a ¼ cycle of an arrangement pitch $\lambda$ of magnetic poles of the field magnet, the surface having a comb tooth-like configuration as a whole.

8. A linear motor actuator according to claim 7, characterized in that fixing means for fixing the sliders to the connecting top board is capable of freely changing a fixing position of the sliders to the connecting top board along a direction in which the table structure moves.

9. A linear motor actuator according to claim 1, characterized in that a distal end surface of the teeth of the armature core is formed in a curved configuration.

10. A linear motor actuator according to claim 1, characterized in that with respect to a plurality of the field magnets arranged on the stationary base portion of the track rail, a boundary between adjacent ones of the field magnets is inclined by a predetermined degree relative to a lateral direction of the track rail.

* * * * *